US012766726B2

(12) United States Patent
Takushima et al.

(10) Patent No.: US 12,766,726 B2
(45) Date of Patent: Oct. 20, 2026

(54) SUBSTRATE TRANSFER SYSTEM

(71) Applicant: SUMCO Corporation, Tokyo (JP)

(72) Inventors: Takayoshi Takushima, Tokyo (JP); Kento Maruyama, Tokyo (JP)

(73) Assignee: SUMCO CORPORATION, Tokyo (JP)

(*) Notice: Subject to any disclaimer, the term of this patent is extended or adjusted under 35 U.S.C. 154(b) by 22 days.

(21) Appl. No.: 19/008,939

(22) Filed: Jan. 3, 2025

(65) Prior Publication Data

US 2025/0269531 A1 Aug. 28, 2025

(30) Foreign Application Priority Data

Feb. 22, 2024 (JP) ................................ 2024-025638

(51) Int. Cl.
*B25J 9/16* (2006.01)
*B25J 11/00* (2006.01)

(52) U.S. Cl.
CPC ........... *B25J 9/1674* (2013.01); *B25J 9/1697* (2013.01); *B25J 11/0095* (2013.01)

(58) Field of Classification Search
CPC ..... B25J 9/1674; B25J 9/1697; B25J 11/0095
See application file for complete search history.

(56) References Cited

U.S. PATENT DOCUMENTS

2008/0124194 A1* 5/2008 van der Meulen . H10P 72/3406 414/217
2021/0366102 A1* 11/2021 Park .......................... G06T 7/60
2024/0253233 A1* 8/2024 Hashizaki .............. B25J 9/1664

FOREIGN PATENT DOCUMENTS

JP 2013-110200 A 6/2013

* cited by examiner

*Primary Examiner* — Dylan M Katz
(74) *Attorney, Agent, or Firm* — Greenblum & Bernstein, P.L.C.

(57) ABSTRACT

The provided is a substrate transfer system that can prevent the mirror-like main surface of the substrate from coming into contact with the system components during transfer and causing scratches on the main surface. The substrate transfer system has a system component; a transfer section that moves a substrate relative to the system component; an imaging section that captures a mirror image of the system component reflected on a mirror-like main surface of the substrate and a real image of the system component, when the substrate is moved by the transfer section; and a judgment section that performs an abnormality judgment to determine whether any abnormality exists in clearance between the main surface of the substrate and the system component, based on the mirror image and the real image captured by the imaging section.

4 Claims, 5 Drawing Sheets

SUBSTRATE TRANSFER SYSTEM

TECHNICAL FIELD

This disclosure relates to a substrate transfer system.

BACKGROUND

A substrate transfer system that moves substrates is known (see, for example, Patent Document 1).

CITATION LIST

Patent Literature

PTL 1: JP 2013-110200 A1

SUMMARY

In the above-mentioned substrate transfer system, it is desirable to be able to prevent the mirror-like main surface of the substrate from coming into contact with a system component during transfer and causing scratches. To achieve this, it is thought that an imaging section could be installed to capture the substrate and the system component from directly beside the substrate, and monitor the clearance between the main surface of the substrate and the system component based on the resulting images. However, in this case, it was difficult to stably monitor the clearance due to the thin substrate and the effects of reflected light, etc.

The object of the present disclosure is to provide a substrate transfer system that can prevent the mirror-like main surface of the substrate from coming into contact with the system components during transfer and causing scratches on the main surface.

One aspect of the present disclosure is as follows.

[1] A substrate transfer system, having a system component;

a transfer section that moves a substrate relative to the system component;

an imaging section that captures a mirror image of the system component reflected on a mirror-like main surface of the substrate and a real image of the system component, when the substrate is moved by the transfer section; and a judgment section that performs an abnormality judgment to determine whether any abnormality exists in clearance between the main surface of the substrate and the system component, based on the mirror image and the real image captured by the imaging section.

[2] The substrate transfer system as described in [1], wherein the judgment section performs the abnormality judgment based on apparent clearance between the mirror image and the real image in an image captured by the imaging section.

[3] The substrate transfer system as described in claim [1] or [2], wherein the judgment section performs the abnormality judgment based on a change between: the clearance calculated for the substrate as a preceding substrate that approaches the system component by the transfer section, and the clearance calculated for the substrate as a succeeding substrate that approaches the system component by the transfer section after the preceding substrate has retreated from the system component.

[4] The substrate transfer system as described in any one of [1] to [3], having a notification section that performs notifications when an abnormality is detected through the abnormality judgement.

[5] The substrate transfer system as described in claim 4, having a second system component;

a second transfer section that moves a second substrate relative to the second system component; and a second imaging section that captures a mirror image of the second system component reflected on a mirror-like main surface of the second substrate and a real image of the second system component, when the second substrate is moved by the second transfer section; wherein the judgement section performs a second abnormality judgment to determine whether any abnormality exists in clearance between the main surface of the second substrate and the second system component, based on the mirror image and the real image captured by the second imaging section, and the notification section performs notifications when an abnormality is detected through the second abnormality judgment.

According to the present disclosure, it is possible to provide a substrate transfer system that can prevent the mirror-like main surface of the substrate from coming into contact with the system components during transfer and causing scratches on the main surface.

DETAILED DESCRIPTION

Hereinafter, an embodiment of the present disclosure will be described with reference to the drawings.

As illustrated in FIGS. 1 to 4, in one embodiment of the present disclosure, a substrate transfer system 1 (see FIG. 4) has a (first) system component 6A (see FIG. 1) that forms part of the substrate transfer system 1; a (first) transfer section 3A that moves a circular (first) substrate 11A relative to the system component 6A; a (first) imaging section 7A (see FIG. 1) that captures a mirror image 12 of the system component 6A reflected on a mirror-like main surface of the substrate 11A and a real image 13 of the system component 6A, when the substrate 11A is moved by the transfer section 3A (see FIG. 2) relative to the system component 6A; and a judgment section 8*a* (see FIG. 4) that performs a (first) abnormality judgment to determine whether any abnormality exists in clearance C (see FIG. 2) between the main surface of the substrate 11A and the system component 6A, based on the mirror image 12 and the real image 13 (see FIG. 3) captured by the imaging section 7A.

Figure 4:
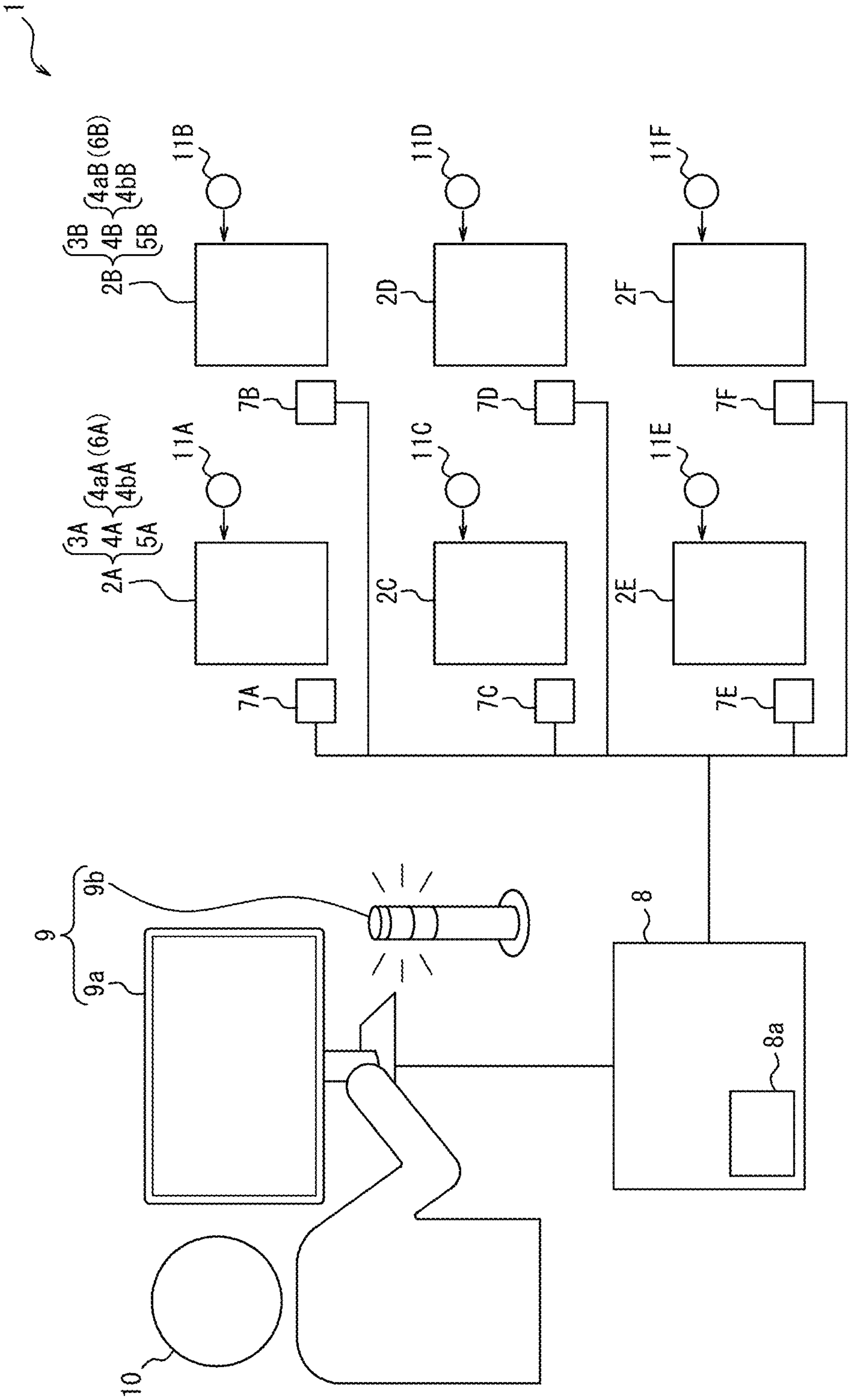
FIG. 4 is a schematic diagram illustrating the overall substrate transfer system.

As illustrated in FIG. 4, in this embodiment, the substrate transfer system 1 has: a (first) transport processing unit 2A, which has the (first) transfer section 3A, a (first) transport pallet 4A, and a (first) processing section 5A; and a (second) transport processing unit 2B, which has a (second) transfer section 3B, a (second) transport pallet 4B, and a (second) processing section 5B. The (first) transport pallet 4A has a (first) gripper 4*a*A as the (first) system component 6A and a (first) pallet 4*b*A. The second transport pallet 4B has a second gripper 4*a*B as a second system component 6B and a second pallet 4*b*B. In addition, the substrate transfer system 1 has the third transport processing unit 2C, the fourth transport processing unit 2D, the fifth transport processing unit 2E, and the sixth transport processing unit 2F. The number of transport processing units in the substrate transfer system 1 can be set as appropriate. The (first) transport processing unit 2A transports and processes the (first) substrate 11A, the (second) transport processing unit 2B transports and processes the (second) substrate 11B, the (third) transport processing unit 2C transports and processes the (third) substrate 11C, the (fourth) transport processing unit 2D transports and processes the (fourth) substrate 11D, the (fifth) transport processing unit 2E transports and processes the (fifth) substrate 11E, and the (sixth) transport processing unit 2F transports and processes the (sixth) substrate 11F.

The substrate transfer system 1 has the (first) imaging section 7A for the (first) transport processing unit 2A, a (second) imaging section 7B for the second transport processing unit 2B, the judgment section 8A, and a notification section 9. The judgment section 8*a* is capable of communicating with the notification section 9, the (first) imaging section 7A, and the second imaging section 7B. In addition, the substrate transfer system 1 has a third imaging section 7C for the third transport processing unit 2C, a fourth imaging section 7D for the fourth transport processing unit 2D, a fifth imaging section 7E for the fifth transport processing unit 2E, and a sixth imaging section 7F for the sixth transport processing unit 2F.

Figure 1:
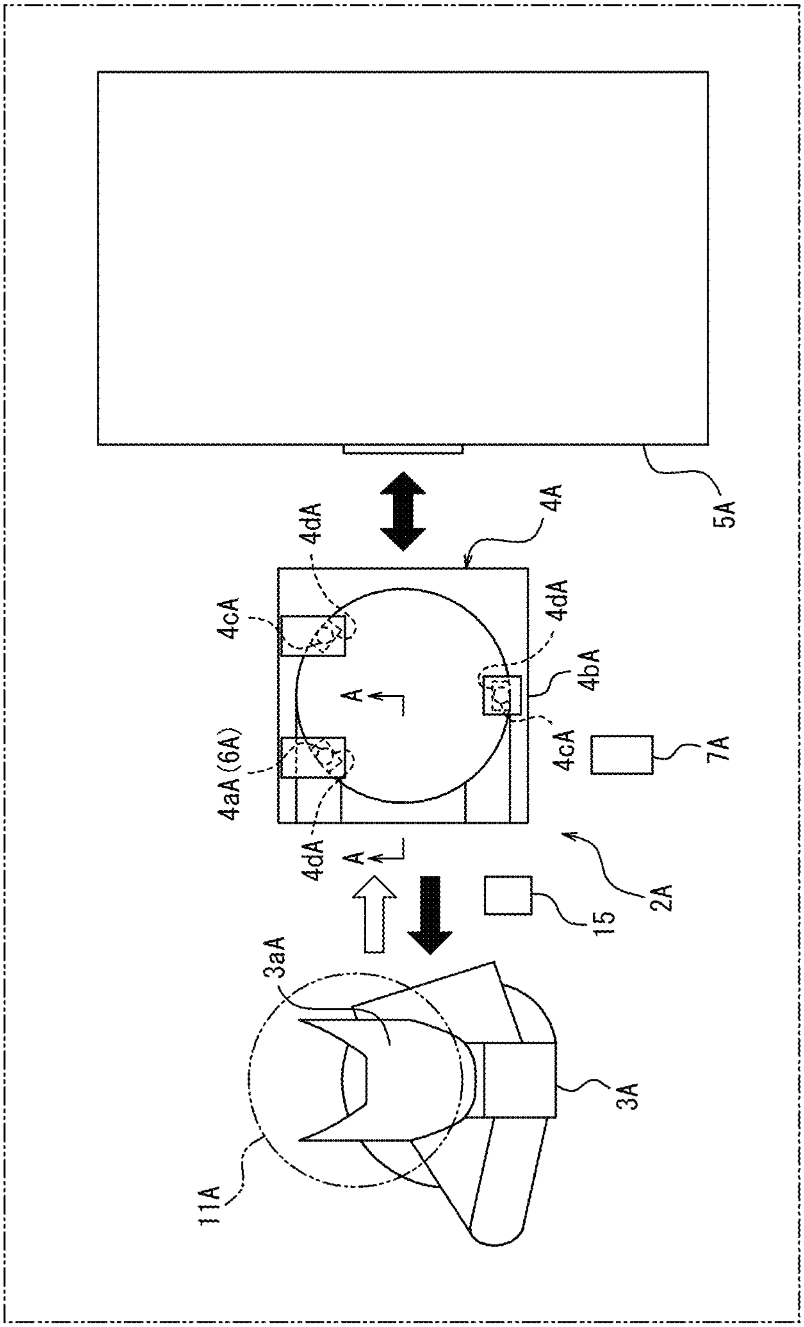
FIG. 1 is a top view of a first transport processing unit of the substrate transfer system according to one embodiment of the present disclosure.
Figure 2:
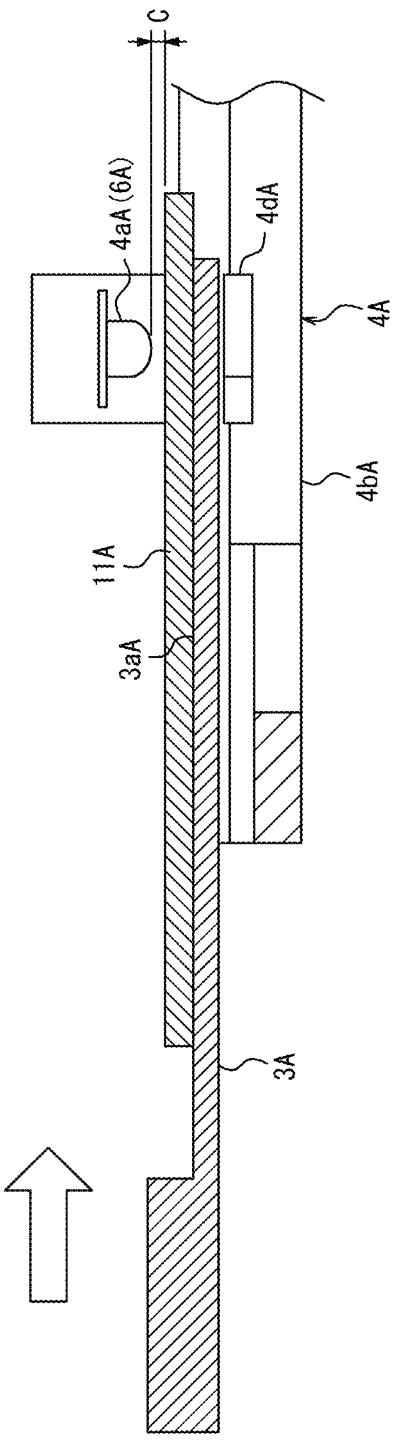
FIG. 2 is a cross-sectional view along the line A-A when a first substrate is moved onto a first transport pallet by a first transfer section.
Figure 3:
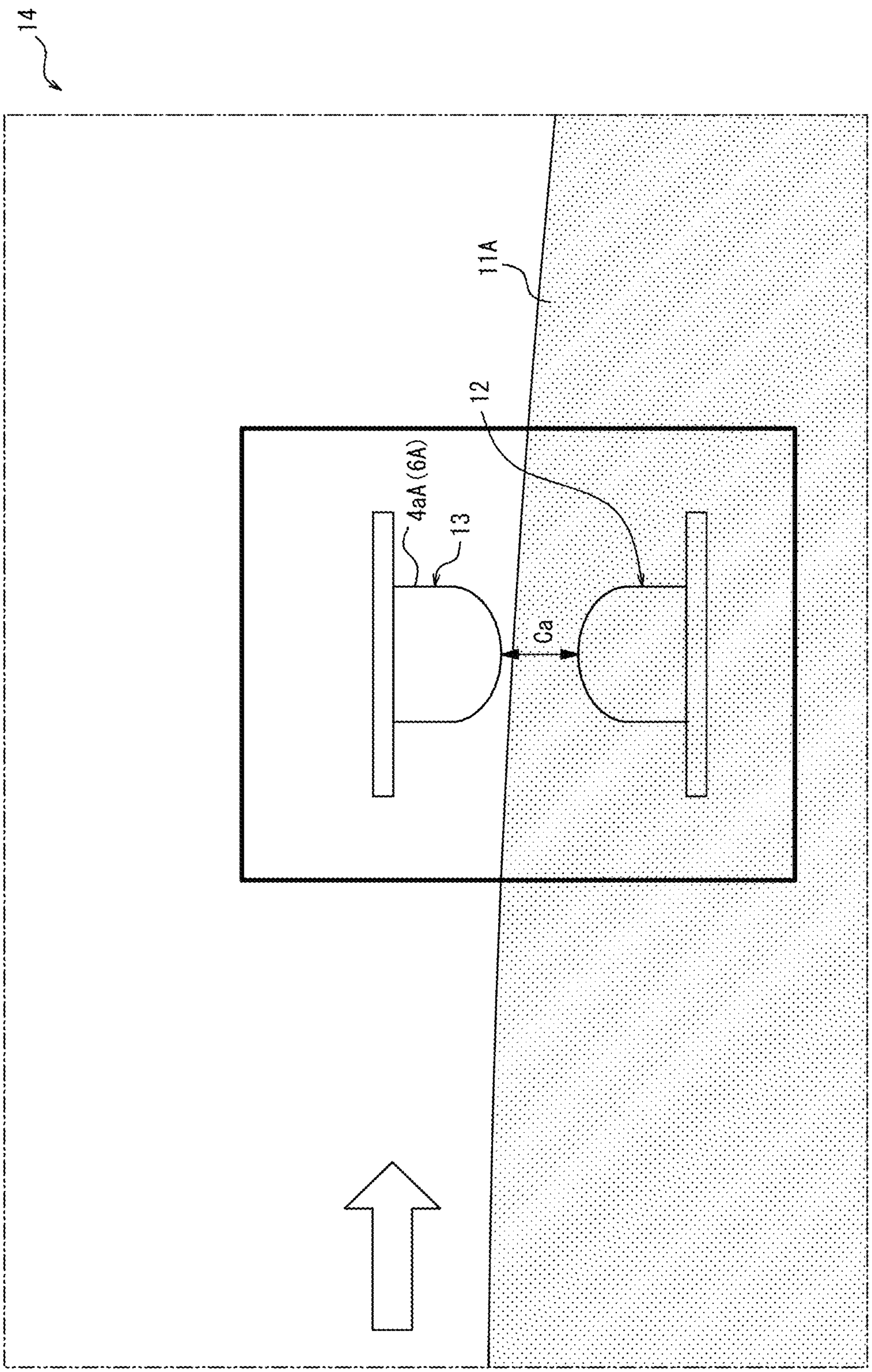
FIG. 3 is a schematic diagram illustrating an image captured by a first imaging section illustrated in FIG. 1.

As illustrated in FIG. 2, when the transfer section 3A moves the substrate 11A (such as a silicon wafer) against the system component 6A, if there is no vertical clearance C between the main surface of the substrate 11A (in this embodiment, the top surface of the circular substrate 11A) and the system component 6A, the main surface of the substrate 11A will come into contact with the system component 6A, and scratches will appear on the main surface of the substrate 11A. Conversely, if the clearance C is too large, the main surface of the other side (under surface) of the substrate 11A may come into contact with other system components, and scratches may appear on the main surface of the other side of the substrate 11A. For this reason, the transfer section 3A is controlled by a control device (not illustrated) composed of a computer or other components so that the appropriate clearance C, which is adjusted in advance, can be allowed during the transfer of the substrate 11A. However, there are cases where the clearance C decreases due to abnormalities in the (first) gripper 4A or due to a malfunction of the robot arm that composes the (first) transfer section 3A or the control device that controls the robot arm. In this embodiment, rather than using the imaging section 7A to capture the substrate 11A and the system component 6A from directly beside the substrate 11A, the imaging section 7A captures them from an oblique angle above the substrate 11A. This allows, as illustrated in FIG. 3, the mirror image 12 of the system component 6A reflected on the mirror-like main surface to be captured in a single image 14 together with its real image 13. Thus, the clearance C can be stably monitored based on the positional relationship between the mirror image 12 and the real image 13 in the image 14. Therefore, it is possible to realize a substrate transfer system 1 that can prevent the mirror-like main surface of the substrate 11A from coming into contact with the system component 6A during transfer and causing scratches on the main surface.

Figure 5:
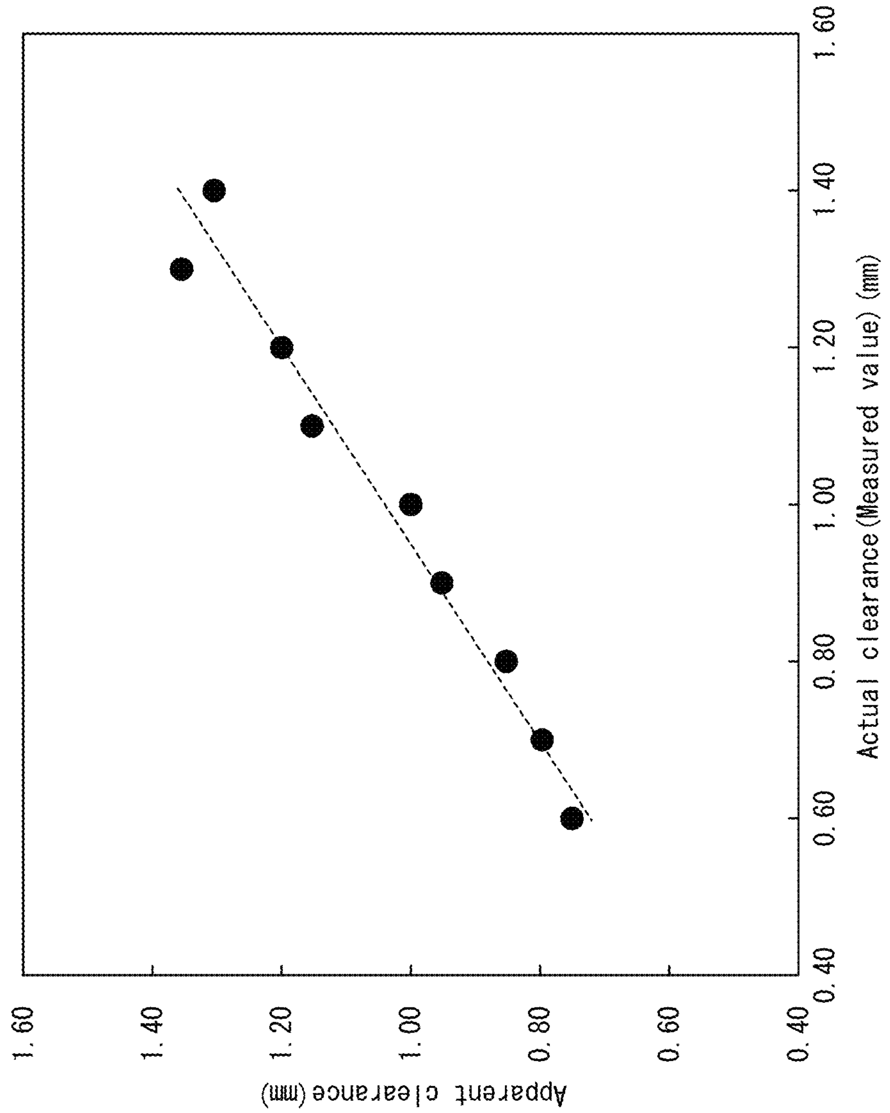
FIG. 5 is a graph providing an example of the relationship between the apparent clearance and the actual clearance in the image illustrated in FIG. 3.

The judgment section 8*a* performs the abnormality judgment based on apparent clearance Ca between the mirror image 12 and the real image 13 in the image 14 captured by the imaging section 7A. According to the above configuration, the clearance C can be monitored more stably based on the apparent clearance Ca (the distance between the mirror image 12 and the real image 13) in the image 14. The apparent clearance Ca correlates with the actual clearance C, as illustrated in FIG. 5, so it is possible to monitor the clearance C based on the apparent clearance Ca. FIG. 5 is a graph providing an example of the relationship between the apparent clearance Ca detected by image processing and the actual measured clearance C. The abnormality judgment is performed, for example, by comparing the calculated value of the apparent clearance Ca with a threshold value. The judgment section 8*a* is composed of a processing device 8 (computer, etc.) that can perform image processing to detect the apparent clearance Ca.

The imaging section 7A is composed of a camera, etc., such as a CCD (Charge Coupled Device) image sensor. The image 14 captured by the imaging section 7A may be a moving image or a still image.

The judgment section 8*a* may be configured to perform the abnormality judgment based on a change between the clearance C calculated for the substrate 11A as a preceding substrate that approaches the system component 6A by the transfer section 3A and the clearance C calculated for the substrate 11A as a succeeding substrate that approaches the system component 6A by the transfer section 3A after the preceding substrate has retreated from the system component 6A. According to the above configuration, it is possible to monitor the changes in the clearance C between the preceding substrate and the succeeding substrate, therefore, to prevent the substrate 11A, which approaches the system component 6A by the transfer part 3A after the succeeding substrate has retreated from the system component 6A from coming into contact with the system component 6A and causing scratches. The abnormality judgment is performed, for example, by comparing the change in the clearance C with a threshold value. In addition, the abnormality judgment may be performed based not only on the change in clearance C, but also on the clearance C calculated for the preceding or succeeding substrate.

The substrate transfer system 1 has the gripper 4*a*A as the system component 6A and the pallet 4*b*A. The gripper 4*a*A holds the substrate 11A between a receiving part 4*d*A of the pallet 4*b*A and the gripper 4*a*A itself by moving forward with respect to the pallet 4*b*A, and releases the substrate 11A by moving backward with respect to the pallet 4*b*A. In addition to the gripper 4*a*A and the pallet 4*b*A, the transport pallet 4A has a plurality of other grippers 4*c*A. The number of other grippers 4*c*A provided on the transport pallet 4A is two in this embodiment, but this is not limited to this number. The transport pallet 4A may be configured without the other grippers 4*c*A. The gripper 4*a*A and the other grippers 4*c*A, respectively, can be made of a fluororesin, such as polytetrafluoroethylene, and others as a material.

The receiving part 4*d*A can be made of engineering plastics, such as Poly Ether Ether Ketone (PEEK), and others as a material.

The transfer section 3A performs two types of transport: the first transport (see the white arrow pointing to the right in FIG. 1) transports the substrate 11A in the forward direction towards the system component 6A, and the second transport (see the bold arrow pointing to the left in FIG. 1) transports the substrate 11A in the backward direction away from the system component 6A.

The transfer section 3A is composed of a robot arm that has a placement part 3*a*A on which the substrate 11A is placed. The substrate 11A that has been placed on the placement part 3A is placed on the pallet 4*b*A of the transport pallet 4A through the first transport performed by the transfer section 3A, and is held between the gripper 4*a*A and the pallet 4*b*A. The substrate 11A is transported into the processing section 5A by the transport pallet 4A in this state, and after the prescribed processing, it is returned to its original position by the transport pallet 4A (see the double-headed bold arrow in FIG. 1). Furthermore, the substrate 11A is released due to the retraction of the gripper 4*a*A and is transported from the transport pallet 4A through the second transport performed by the transfer part 3A.

The imaging section 7A may be configured to constantly perform capturing to monitor the clearance C, or it may be configured to perform capturing only when necessary. In this case, for example, a sensor 15 that detects the first transport can be provided, and the processing device 8 that controls the imaging device 7A can be linked to the sensor 15, so that the imaging device 7A can be configured to perform capturing only at the timing when the first transport is performed.

As illustrated in FIG. 4, the substrate transfer system 1 has a notification section 9 that performs notifications when an abnormality is detected through the abnormality judgement. According to the above configuration, by notifying the system administrator 10 of the abnormality through the notifications, it is possible to alert them and let them take measures such as inspecting the substrate transfer system 1 or stopping its operation. The notification section 9 can be composed of a monitor 9*a* that provides notification by displaying information on the screen, a warning light 9*b* that provides notification by light, or a buzzer (not illustrated) that provides notification by sound, but this is not limited to these.

As illustrated in FIG. 4, the substrate transfer system 1 has a second system component 6B that forms part of the substrate transfer system 1; a second transfer section 3B that moves a second substrate 11B relative to the second system component 6B; and a second imaging section 7B that captures a mirror image 12 of the second system component 6B reflected on a mirror-like main surface of the second substrate and a real image 13 of the second system component 6B, when the second substrate is moved by the second transfer section 3B. The judgement section 8*a* performs a second abnormality judgment to determine whether any abnormality exists in clearance C between the main surface of the second substrate and the second system component 6B, based on the mirror image 12 and the real image 13 captured by the second imaging section 7B. The notification section 9 performs notifications when an abnormality is detected through the second abnormality judgment. According to the above configuration, the first abnormal judgment and its notification and the second abnormal judgment and its notification can be performed using the common judgment section 8*a* and the notification section 9, therefore, efficient operation of the entire system can be achieved. However, the substrate transfer system 1 may be configured not only as described above, using a common judgment section 8*a*, but also, for example, with a separate first judgment section (not illustrated) for performing the first abnormality judgment and a separate second judgment section (not illustrated) for performing the second abnormality judgment.

Although the embodiment of the present disclosure has been described above, the present disclosure is not limited to the above-described embodiment, and the above-described embodiment can be modified in various ways without departing from the gist of the present disclosure.

The invention claimed is:

1. A substrate transfer system, having a system component;

a transfer section that moves a substrate relative to the system component;

an imaging section that captures a mirror image of the system component reflected on a mirror-like main surface of the substrate and a real image of the system component, when the substrate is moved by the transfer section; and a judgment section that performs an abnormality judgment to determine whether any abnormality exists in clearance between the main surface of the substrate and the system component, based on the mirror image and the real image captured by the imaging section, wherein the judgment section performs the abnormality judgment based on a change between: the clearance calculated for the substrate as a preceding substrate that approaches the system component by the transfer section, and the clearance calculated for the substrate as a succeeding substrate that approaches the system component by the transfer section after the preceding substrate has retreated from the system component.

2. The substrate transfer system as described in claim 1, wherein the judgment section performs the abnormality judgment based on apparent clearance between the mirror image and the real image in an image captured by the imaging section.

3. The substrate transfer system as described in claim 1, having a notification section that performs notifications when an abnormality is detected through the abnormality judgement.

4. The substrate transfer system as described in claim 3, having a second system component;

a second transfer section that moves a second substrate relative to the second system component; and a second imaging section that captures a mirror image of the second system component reflected on a mirror-like main surface of the second substrate and a real image of the second system component, when the second substrate is moved by the second transfer section; wherein the judgement section performs a second abnormality judgment to determine whether any abnormality exists in clearance between the main surface of the second substrate and the second system component, based on the mirror image and the real image captured by the second imaging section, and the notification section performs notifications when an abnormality is detected through the second abnormality judgment.

* * * * *